(12) United States Patent
Komada et al.

(10) Patent No.: US 9,945,759 B2
(45) Date of Patent: Apr. 17, 2018

(54) VEHICLE TEST SYSTEM, TEST CONDITION DATA GENERATION APPARATUS, AND VEHICLE TEST METHOD

(71) Applicant: HORIBA, Ltd., Kyoto (JP)

(72) Inventors: Mineyuki Komada, Kyoto (JP); Yasuyuki Sado, Kyoto (JP); Kazuhiro Shiomi, Kyoto (JP); Katsumi Uratani, Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 14/713,910

(22) Filed: May 15, 2015

(65) Prior Publication Data

US 2015/0332520 A1    Nov. 19, 2015

(30) Foreign Application Priority Data

May 19, 2014   (JP) .................................. 2014-103854

(51) Int. Cl.
*G01M 17/00*       (2006.01)
*G06F 7/00*        (2006.01)
(Continued)

(52) U.S. Cl.
CPC .......... *G01M 17/007* (2013.01); *G01M 15/10* (2013.01); *G07C 5/02* (2013.01); *G07C 5/08* (2013.01)

(58) Field of Classification Search
None
See application file for complete search history.

(56) References Cited

U.S. PATENT DOCUMENTS

| 4,393,695 | A |   | 7/1983  | Marshall et al. |
| 6,141,608 | A | * | 10/2000 | Rother ................ G01M 17/007 |
|           |   |   |         | 701/29.1 |

(Continued)

FOREIGN PATENT DOCUMENTS

| DE | 102004003099 B4 * | 12/2005 | .......... G01M 17/007 |
| EP | 2246686 A1 *      | 11/2010 | ........ G01M 17/0074 |

(Continued)

OTHER PUBLICATIONS

Office Action dated Jul. 18, 2017 issued in European patent application No. 15 167 509.7.

(Continued)

*Primary Examiner* — Thomas G Black
*Assistant Examiner* — Demetra R Smith-Stewart
(74) *Attorney, Agent, or Firm* — Brooks Kushman P.C.

(57) ABSTRACT

A vehicle test system according to the present invention intends to comprehensively manage and operate multiple types of test apparatuses to smoothly perform vehicle development, problem correction, and the like. For this purpose, the vehicle test system includes an actual running data acquisition apparatus that acquires actual running data that is data related to states inside and outside of a vehicle in running on a road; multiple types of test apparatuses each of which performs a drive test or an operation test of a vehicle or a part of the vehicle in accordance with set test conditions; and a test condition data generation apparatus that from the actual running data, generates test condition data indicating test conditions necessary to reproduce a part or all of the running states indicated by the actual running data in a test apparatus specified from among the multiple types of test apparatuses.

4 Claims, 8 Drawing Sheets

(51) Int. Cl.
*G01M 17/007* (2006.01)
*G07C 5/02* (2006.01)
*G01M 15/10* (2006.01)
*G07C 5/08* (2006.01)

(56) References Cited

U.S. PATENT DOCUMENTS

| | | | | |
|---|---|---|---|---|
| 7,146,859 B2* | 12/2006 | Dittmann | ............ | G01M 13/027 73/669 |
| 8,239,093 B1* | 8/2012 | Thompson | ............ | G07C 5/0808 701/30.9 |
| 8,726,203 B1* | 5/2014 | Uckun | ............ | G01R 31/318357 700/1 |
| 9,501,876 B2* | 11/2016 | Uratani | ................ | G01M 15/10 |
| 2002/0018982 A1* | 2/2002 | Conroy | ................ | G09B 9/042 434/62 |
| 2002/0138185 A1* | 9/2002 | Trsar | ................ | G07C 5/085 701/29.1 |
| 2006/0069962 A1* | 3/2006 | Dittmann | ............ | G01M 13/027 714/40 |
| 2007/0260438 A1* | 11/2007 | Langer | ................ | G01M 17/007 703/8 |
| 2008/0004840 A1* | 1/2008 | Pattipatti | ............ | G05B 23/0243 702/183 |
| 2010/0286880 A1* | 11/2010 | Cahill | ................ | B60T 8/1703 701/70 |
| 2011/0161104 A1* | 6/2011 | Gilbert | ................ | G06N 5/003 705/2 |

FOREIGN PATENT DOCUMENTS

| | | |
|---|---|---|
| JP | 05079949 A | 3/1993 |
| JP | 07273718 A | 10/1995 |
| JP | 08233738 A | 9/1996 |
| JP | 08304237 A | 11/1996 |
| JP | 2001-108580 | 4/2001 |
| JP | 2005214822 A | 8/2005 |
| JP | 4173112 | 10/2008 |
| JP | 2011038929 A | 2/2011 |
| JP | 2013245976 A | 12/2013 |

OTHER PUBLICATIONS

Olaf Gietelink et al: "Development of advanced driver assistance systems with vehicle hardware-in-the-loop simulations", Vehicle System Dynamics, vol. 44, No. 7, Jul. 1, 2006, pp. 569-590.
Office Action dated Jul. 25, 2017 issued in Japanese patent application No. 2014-103854.

* cited by examiner

FIG.7

VEHICLE TEST SYSTEM, TEST CONDITION DATA GENERATION APPARATUS, AND VEHICLE TEST METHOD

CROSS-REFERENCE TO RELATED APPLICATION

This application claims priority to JP Application No. 2014-103854, filed May 19, 2014, the disclosure of which is incorporated in its entirety by reference herein.

TECHNICAL FIELD

The present invention relates to a vehicle test system and the like for testing a vehicle such as a car or part of the vehicle.

BACKGROUND ART

In order to develop vehicles and/or solve problems, various test apparatuses such as a chassis dynamometer for testing completed vehicles and an engine dynamometer for examining engines themselves as parts of vehicles have been used.

Such test apparatuses are adapted to be able to produce a simulated or virtual load or environment supposed to be produced during an actual run and make the load or environment act on respective parts of a vehicle by setting predetermined test conditions.

The load or environment can also be obtained by, for example, actually running a car on a road. Japanese Unexamined Patent Publication JP-A2001-108580 describes that actual road gradients are measured while running a car at the gradients, and test conditions making loads equivalent to the measured gradients act on a vehicle are set in a chassis dynamometer. Also, Japanese Patent No. 4173112 describes that test conditions to be given to a brake dynamometer for testing vehicle brakes are set on the basis of actual running data obtained through an actual test course run.

However, in any of the above-described configurations, every time the type of a test apparatus is changed, test conditions suitable for a changed test apparatus should be calculated from actual running data, or a data format should be converted. That is, there exists a problem of difficulty to comprehensively manage and operate multiple types of test apparatuses for testing a vehicle and respective parts of the vehicle.

SUMMARY OF INVENTION

Technical Problem

The present invention is made in consideration of such a problem, and a main object thereof is to comprehensively manage and operate multiple types of test apparatuses for testing a vehicle and respective parts of the vehicle on the basis of actual running data, and smoothly perform vehicle development, problem correction, and the like.

Solution to Problem

That is, a vehicle test system according to the present invention includes: an actual running data acquisition apparatus that acquires actual running data that is data related to states inside and outside of a vehicle in running on a road; multiple types of test apparatuses each of which performs a drive test or an operation test of a vehicle or a part of the vehicle in accordance with a set test condition; and a test condition data generation apparatus that from the actual running data, generates test condition data indicating a test condition necessary to reproduce a part or all of running states indicated by the actual running data in a test apparatus specified from among the multiple types of test apparatuses.

Since the one test condition data generation apparatus generates pieces of test condition data for testing in the multiple types of test apparatuses, such a vehicle test system can comprehensively manage and operate the multiple types of test apparatuses only by controlling the test condition data generation apparatus. For this reason, various tests for new vehicle development, problem correction, and the like can be smoothly performed.

Also, the test condition data generation apparatus generates test condition data from actual running data, and therefore a state closer to an actual running state can be reproduced to increase the accuracy of a test.

As a specific embodiment of the vehicle test system according to the present invention, an embodiment in which the actual running data acquisition apparatus transmits actual running data to the test condition data generation apparatus in real time, and the test condition data generation apparatus is configured to transmit test condition data generated from the received actual running data to a predetermined test apparatus can be cited.

In such a configuration, since actual running data is transmitted to the test condition data generation apparatus in real time, the test condition data generation apparatus can also generate test condition data in real time to perform a test in a test apparatus in parallel to an actual run, and therefore a problem occurring at the time of the actual run can be immediately reproduced in the test apparatus, thus making it possible to quickly analyze the problem.

As another specific embodiment of the vehicle test system according to the present invention, an embodiment in which the test condition data generation apparatus selects actual running data necessary to reproduce the running states in the specified test apparatus, and generates the test condition data from the selected actual running data can be cited.

In such a configuration, when the test condition data generation apparatus generates test condition data, unnecessary actual running data is not included, and therefore a time to process unnecessary actual running data can be shortened to smoothly generate test condition data corresponding to each of the test apparatuses.

As still another embodiment of the vehicle test system according to the present invention, an embodiment in which the test condition data generation apparatus includes a simulation preference order setting part that specifies an actual running data content to be preferentially simulated among contents of actual running data, and generates the test condition data from the actual running data content specified in the simulation preference order setting part can be cited.

In such a configuration, test condition data corresponding to a user's desired content can be generated by the assistance of the simulation preference order setting part. As a result, a wide variety of tests such as tests in a failure reproduction mode and a specific running pattern reproduction mode can be performed and a user-friendly system can be provided.

Also, a test condition data generation apparatus of the present invention is one configured to be able to receive data from an actual running data acquisition apparatus that acquires actual running data that is data related to running states inside and outside of a vehicle in running on a road, and from the actual running data, generates test condition data indicating a test condition necessary to reproduce a part or all of the running states indicated by the actual running data in a test apparatus specified from among multiple types of test apparatuses each of which performs a drive test or an operation test of a vehicle or a part of the vehicle in accordance with a set test condition.

That is, the test condition data generation apparatus of the present invention generates test condition data corresponding to each of the test apparatuses from actual running data.

Further, a test condition data generation program of the present invention is one configured to be able to receive data from an actual running data acquisition apparatus that acquires actual running data that is data related to running states inside and outside of a vehicle in running on a road, and from the actual running data, generates test condition data indicating a test condition necessary to reproduce a part or all of the running states indicated by the actual running data in a test apparatus specified from among multiple types of test apparatuses each of which performs a drive test or an operation test of a vehicle or a part of the vehicle in accordance with a set test condition.

Still further, a vehicle test method of the present invention is one in which
an actual running data acquisition apparatus acquires actual running data that is data related to states inside and outside of a vehicle in running on a road, and on the basis of the actual running data, a test condition data generation apparatus generates test condition data indicating a test condition necessary to reproduce a part or all of running states indicated by the actual running data in a test apparatus specified from among multiple types of test apparatuses each of which performs a drive test or an operation test of a vehicle or a part of the vehicle in accordance with a set test condition.

Advantageous Effects of Invention

The present invention configured as described can comprehensively manage and operate multiple types of test apparatuses to smoothly perform vehicle development, problem correction, and the like.

BRIEF DESCRIPTION OF THE DRAWINGS

FIG. 7 is an image displayed on the display by the display output part in the present embodiment.

DESCRIPTION OF EMBODIMENTS

Figure 1:
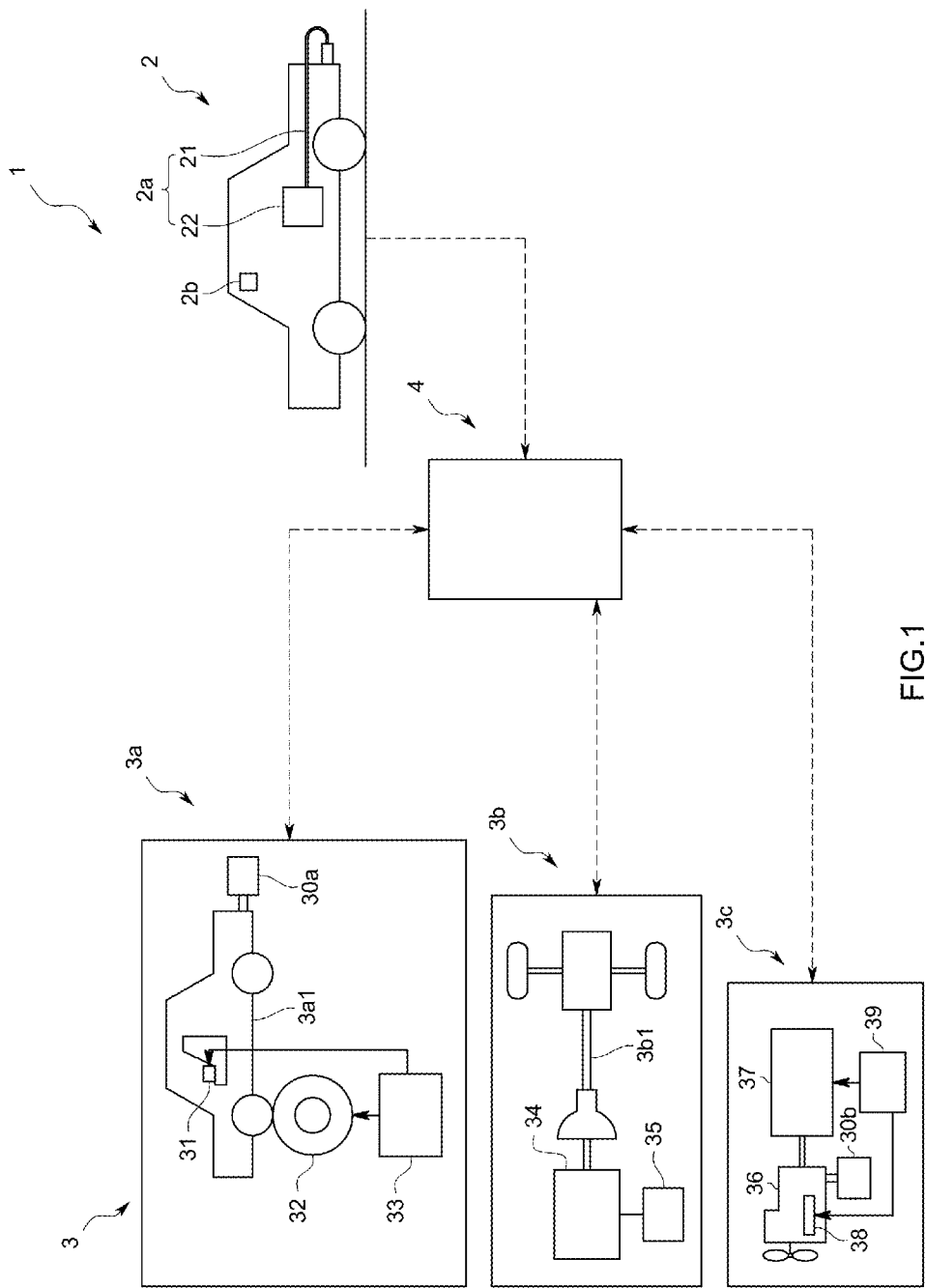
FIG. 1 is a schematic diagram illustrating a vehicle test system in the present embodiment.

One embodiment of the present invention will be described below with reference to drawings.

A vehicle test system 1 according to the present embodiment includes: an actual running data acquisition apparatus 2 adapted to acquire actual running data that is data related to states inside and outside of a vehicle in running on a road; a test bench 3 adapted to test a vehicle and part of the vehicle; and a test management apparatus 4 adapted to set test conditions in the test bench 3 and perform test management, and is a comprehensive system used for new vehicle development, problem correction, and the like.

The respective parts are described.

The actual running data acquisition apparatus 2 is one that is mounted in, for example, a vehicle. Actual running data herein refers to data indicating states inside and outside of a vehicle, of which in-vehicle states include the following states.

(1) Operating states of a shift lever, accelerator pedal, brake pedal, clutch pedal, blinkers, and the like.

(2) Running states such as an engine rotational speed, vehicle speed, vehicle acceleration, wheel rotational speed, torque, engine oil temperature, intake temperature, exhaust gas amount, exhaust gas components, exhaust gas temperature, catalyst temperature, fuel consumption, coolant amount, coolant temperature, shaft angle, and tire temperature, electric power balance, and battery state.

(3) OBD signals (i.e., abnormality information, vehicle information, and the like), CAN signals (i.e., vehicle information, ECU information, TCU information, and other information).

On the other hand, out-vehicle states include the following states.

(4) Weather (outside temperature, outside pressure, rain or shine, wind speed, and the like), road surface temperature, road surface states (wet, dry, ice, asphalt, gravel, and the like), external image, in-vehicle image, road gradients, position, traveling wind, and the like.

In addition, in-vehicle states of hybrid vehicles and electric vehicles include the following states.

(5) State of charge (SOC), current flowing from a battery to a motor and/or voltage between the battery and the motor, battery temperature, motor temperature, inverter temperature, battery power, motor torque and/or rotation speed, and the like.

To measure the above-described in-vehicle and out-vehicle states, for example, two types of actual running data acquisition apparatuses 2 are provided here.

One of them is an in-vehicle exhaust gas analysis apparatus 2a that takes in exhaust gas from a vehicle in running on a road to measure the components and amount of the exhaust gas and calculate a fuel consumption. As illustrated in FIG. 1, the exhaust gas analysis apparatus 2a includes: a hose 21 adapted to take in part of the exhaust gas from the tail pipe of the vehicle; and an analysis apparatus body 22 adapted to analyze the exhaust gas taken in through the hose 21 to measure the amounts (or concentrations) of components contained in the exhaust gas, such as CO, $CO_2$, $H_2O$, $NO_x$, THC, and PM.

The other one is a running measurement apparatus 2b attached to the vehicle. The running measurement apparatus 2b includes an unillustrated GPS receiver, imager, vehicle information acquirer, G sensor, and the like, and thereby adapted to be able to detect: from the GPS receiver, a vehicle position; from the imager, external images as viewed through the windshield and/or the rear window, and various types of information (such as rain or shine, and road surface states) detectable from the external images; from the vehicle information acquirer, various pieces of information (such as an engine rotation speed, vehicle speed, vehicle acceleration, wheel rotation speed, torque, engine oil temperature, intake temperature, outside temperature, outside pressure, and wind speed) from various types of sensors and the like attached to the vehicle, OBD signals from the vehicle, electric power balance from a power analyzer, and a battery state from an HCU; from the G sensor, vehicle acceleration; and the like. In addition, various sensors adapted to detect in-vehicle and out-vehicle states may be provided.

The test bench 3 is one that is installed, for example, inside a room. The test bench 3 here includes multiple types of test apparatuses such as a chassis test apparatus 3a, a drivetrain test apparatus 3b, and an engine test apparatus 3c.

The chassis test apparatus 3a is an apparatus for testing completed vehicles, and adapted to include: a chassis dynamometer 32 on which a vehicle 3a1 is mounted; an automatic driving robot 31 (automatic actuator) that drives the vehicle 3a1 on the chassis dynamometer 32; and an automatic driving unit 33 that receives test condition data in a predetermined format for running the vehicle 3a1 in a simulated manner, and in accordance with test conditions indicated by the test condition data, controls the chassis dynamometer 32 and the automatic driving robot 31. Note that the chassis test apparatus 3a in this embodiment also includes an unillustrated temperature controller, pressure controller, and a vehicle speed fan, and is adapted to be able to control outside temperature, outside pressure, wind speed while the vehicle 3a1 is running, and the like by instructions from the automatic driving unit 33.

The drivetrain test apparatus 3b is an apparatus for testing drivetrain components 3b1 of a vehicle (such as a clutch, torque converter, transmission, and powertrain), and adapted to include: for example, a virtual engine dynamometer 34 that simulates an engine; and a controller 35 that receives test condition data in a predetermined format, and in accordance with test conditions indicated by the test condition data, controls the virtual engine dynamometer 34. In addition, the drivetrain test apparatus 3b is adapted to be able to make simulated loads, vibrations, and the like act on the drivetrain components 3b1 by connecting the drivetrain components 3b1 to the virtual engine dynamometer 34.

The engine test apparatus 3c is an apparatus for testing an engine 36, and adapted to include: an engine dynamometer 37 that simulates components to be connected to the engine 36; a throttle actuator 38 that drives a throttle of the engine 36; and an EG controller 39 that receives test condition data in a predetermined format and in accordance with test conditions indicated by the test condition data, controls the engine dynamometer 37 and the throttle actuator 38. In addition, as the throttle actuator 38 described above, for example, an actuator of an electronic control type can be used.

Further, the test bench 3 in this embodiment includes exhaust gas analyzers 30 (30a and 30b). The exhaust gas analyzers 30 are ones that can measure the amounts (or concentrations) of components contained in exhaust gas, such as CO, $CO_2$, $H_2O$, $NO_x$, THC, and PM, and here adapted to be able to measure exhaust gas from a vehicle mounted on the chassis dynamometer 31 and exhaust gas from the engine 36 connected to the engine dynamometer 37.

The test management apparatus 4 is one that transmits corresponding test condition data to each of the test apparatuses 3a, 3b, and 3c, and manages the content, timing, and the like of operation of the test apparatus 3a (3b or 3c), and here adapted to be able to manage operation timings of the exhaust gas analyzers 30 in synchronization with the operation timing of the test apparatus 3a (3b or 3c).

Further, in the present embodiment, the test management apparatus 4 is adapted to carry a function as a test condition data generation apparatus that acquires the actual running data from the actual running data acquisition apparatus 2, and from the actual running data, generates test condition data indicating test conditions necessary to reproduce/simulate part or all of running states indicated by the actual running data.

Note that the test conditions include, for example, following contents.

Running pattern analysis

Reproduction of a failure mode

Reproduction of a driver by an automatic driving system

Reproduction of on-road loads by the chassis test apparatus 3a or the drivetrain test apparatus 3b Advance evaluation in new vehicle development Reproduction of vehicle states in an environmental bench or a temperature control apparatus Measurement of states unmeasurable on a road by the test apparatuses 3a, 3b, and 3c (For example, the in-vehicle exhaust gas analysis apparatus cannot perform measurement at high altitude, but by reproducing actual road states using a low-temperature low-pressure bench, can measure exhaust gas data.)

CAT (catalyst) temperature control in the engine test apparatus 3c

LLC (coolant) temperature control in the engine test apparatus 3c

Oil temperature control in the engine test apparatus 3c

Intake air temperature control in the engine test apparatus 3c

Next, the test management apparatus 4 is described in detail.

Figure 2:
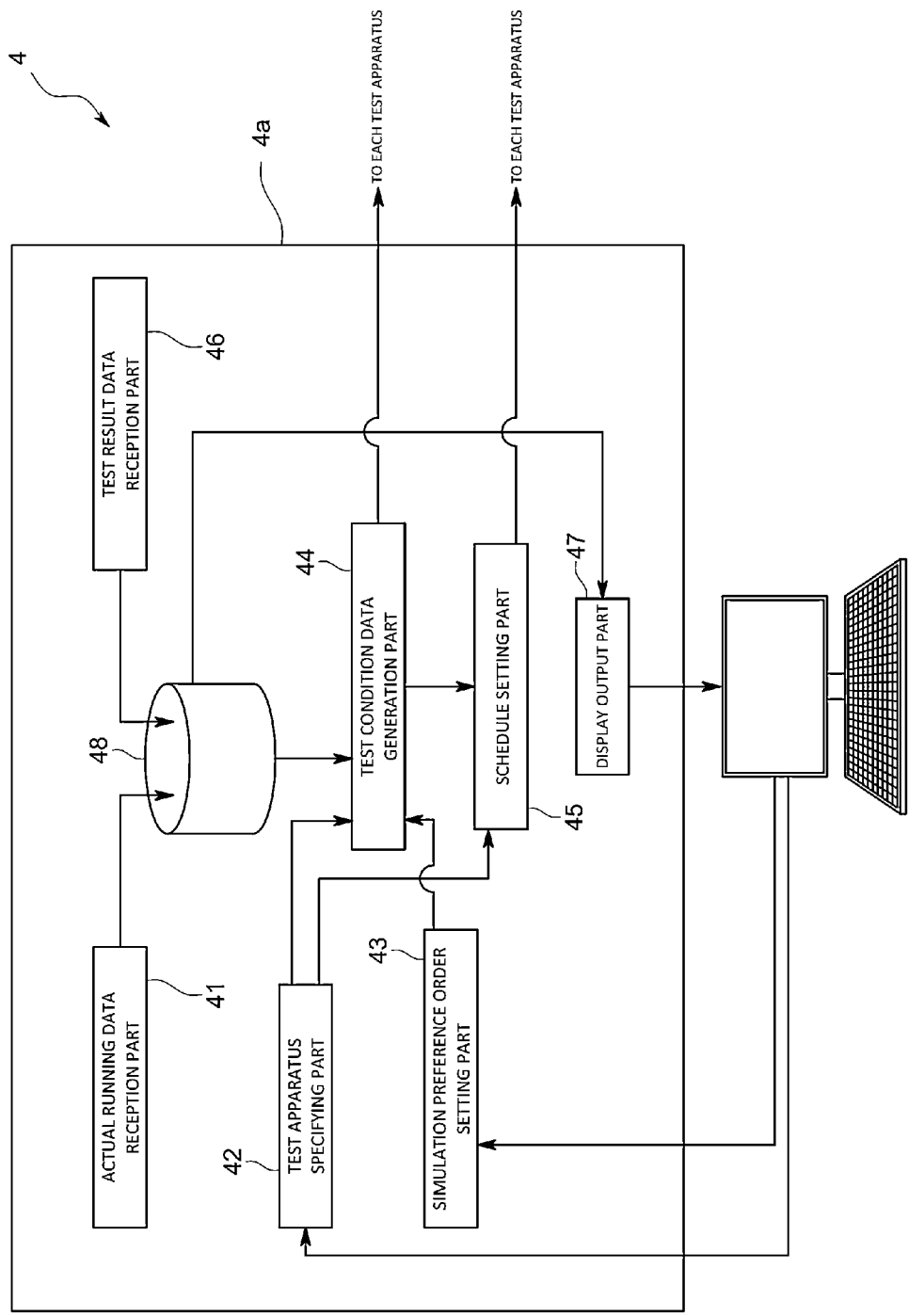
FIG. 2 is a schematic diagram illustrating a test management apparatus in the present embodiment.

As illustrated in FIG. 2, the test management apparatus 4 is configured to include: a computer body 4a having a CPU, a memory 48, an A/D converter, a D/A converter, a communication port, and the like; input means connected to the computer body, such as a keyboard and a mouse; and a display.

In addition, by installing a predetermined program in the memory 48, the test management apparatus 4 carries functions as an actual running data reception part 41, a test condition data generation part 44, a test apparatus specifying part 42, a simulation preference order setting part 43, a schedule setting part 45, a test result data reception part 46, a display output part 47, and the like.

The respective parts are described.

The actual running data reception part 41 is one that receives actual running data acquired by the actual running data acquisition apparatus 2 and stores the actual running data in a predetermined area of the memory 48. In addition, in this embodiment, the actual running data is transmitted from the actual running data acquisition apparatus 2 mounted in a vehicle in test running on a road to a dedicated server wirelessly via the Internet or a dedicated line, and then transmitted from the dedicated server to the actual running data reception part 41 in real time. Note that the real time refers to a state where pieces of data are successively transmitted from the dedicated server, and a state where some delay occurs in timing when data is transmitted from the dedicated server to the actual running data reception part 41 is also included in the real time transmission state. In addition, in some cases, actual running data is not transmitted in real time, but may be stored in a portable recording medium such as a USB or a hard disk and received by the actual running data reception part 41.

The test apparatus specifying part 42 is one that specifies one or more of the test apparatuses 3a, 3b, and 3c (including the exhaust gas analyzers) to be used for testing by, for example, receiving selection input by an operator. A test object is different among the test apparatuses 3a, 3b and 3c, and therefore test condition data necessary for testing is also different among the test apparatuses 3a, 3b, and 3c. For this reason, the respective test apparatuses 3a, 3b, and 3c, and the exhaust gas analyzers 30 are registered in the memory 48 with identifiers thereof related to the contents and formats of pieces of corresponding test condition data. Further, the present embodiment is configured to, when selectively inputting some of the test apparatuses 3a, 3b, and 3c (and the exhaust gas analyzers 30), display symbols indicating the registered test apparatuses 3a, 3b, and 3c (and the exhaust gas analyzers 30) on a screen and only select desired symbols. In addition, the present embodiment is adapted to be able to register a new test apparatus together with the contents and format of corresponding test condition data, and also delete an already registered test apparatus.

The simulation preference order setting part 43 is one that through operator's input or the like, specifies which content among contents of actual running data is preferentially simulated. For example, in the case of the chassis test apparatus 3a, a load by the chassis dynamometer 32 cannot necessarily strictly reproduce a load on a road, and therefore it is necessary to preferentially reproduce any of among the contents of the actual running data, for example, an accelerator opening degree, vehicle speed, engine rotation speed, tire speed, roller speed, and tire shaft (torque). Which of them is given preference should be determined by an operator although different depending on whether the purpose is development or problem correction. Also, depending on a test apparatus or test content, preference order may be automatically determined without determination by an operator, and in such a case, the simulation preference order setting part 43 automatically sets the preference order.

The test condition data generation part 44 is one that generates test condition data necessary to simulate a running mode indicated by actual running data, and generates test condition data corresponding to the format of each of the test apparatuses 3a, 3b, and 3c.

In the present embodiment, the test condition data generation part 44 generates test condition data corresponding to a test apparatus 3a (3b or 3c) specified by the test apparatus specifying part 42, as well as generating the test condition data on the basis of a content given preference by the simulation preference order setting part 43. Specifically, when the test apparatus specifying part 42 specifies the chassis test apparatus 3s, the test condition data generation part 44 acquires the contents, format, and the like of test condition data related to the chassis test apparatus 3a from the memory 48.

Then, when the simulation preference order setting part 43 specifies, for example, vehicle speed among the contents of the test condition data related to the chassis test apparatus 3a, the test condition data generation part 44 receives the content, and to generate test condition data in which the vehicle speed is given preference, acquires necessary actual running data from the memory 48, followed by generating the test condition data to transmit it to the automatic driving unit 33 of the chassis test apparatus 3a. When doing this, the test condition data generation part 44 generates the test condition data in accordance with the format of the chassis test apparatus 3a acquired from the memory 48.

The schedule setting part 45 is one that sets a time schedule from the start of a test to the end of the test, and in the present embodiment, receives test apparatus data from the test apparatus specifying part 42 as well as receiving test condition data generated by the test condition data generation part 44 to set a time schedule from the start of a test to the end of the test. After that, the schedule setting part 45 transmits set schedule data to a test apparatus 3a (3b or 3c) specified by the test apparatus specifying part 42.

For example, in the case of desiring to reproduce the same temperature and humidity as those at the time of an actual run in the chassis test apparatus 3a, it is necessary to set the temperature and humidity of a room where the chassis test apparatus 3a is installed to predetermined values at the start of the test. For this purpose, the schedule setting part 45 incorporates contents to be reproduced, such as room temperature and pressure, in a schedule.

The test result data reception part 46 is one that receives test result data that is data indicating a test result transmitted from each of the test apparatuses 3a, 3b, and 3c. The test result data is data including contents such as an engine rotation speed, wheel rotation speed, torque, engine oil temperature, intake temperature, exhaust gas amount, exhaust gas components, exhaust gas temperature, catalyst temperature, fuel consumption, coolant temperature, shaft torque, and tire temperature obtained in each of the test apparatuses 3a, 3b, and 3c, and these data contents are appropriately detected by sensors and the like provided in the test apparatus 3a, 3b, or 3c. The received test result data is stored in a predetermined area of the memory 48. In addition, test result data can also be synchronized with actual running data.

The display output part 47 is one that acquires predetermined actual running data or test result data from the memory 48, as well as displaying it on the display or the like.

Figure 3:
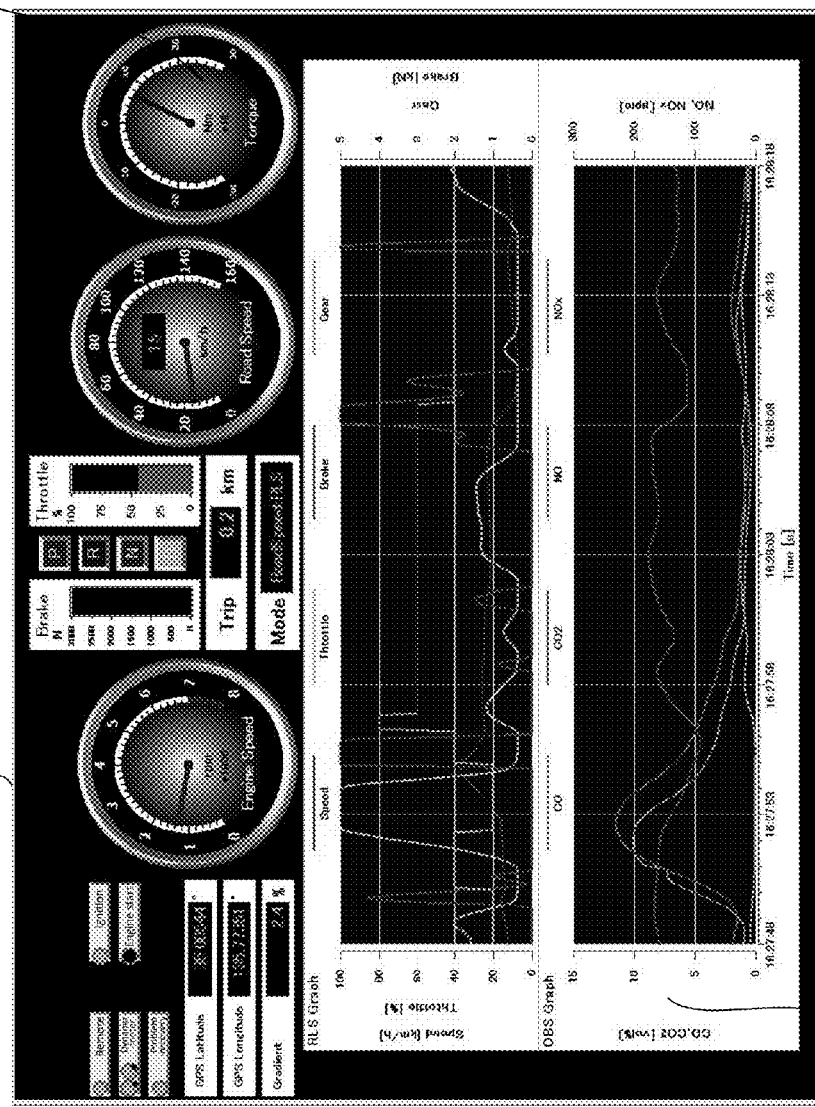
FIG. 3 is an image displayed on a display by a display output part in the present embodiment.

FIG. 3 is an example of an image displayed on the display by the display output part 47. As illustrated in FIG. 3, the image G1 includes: a test state display part L1 that displays a test state of the chassis test apparatus 3a at predetermined time; and a graph display part L2 that displays pieces of information accumulated with time in a graph format. In the image G1, the test state display part L1 includes display parts and the like adapted to display an engine speed, vehicle speed, torque, brake state, shift lever state, and the like. Also, the graph display part L2 displays a graph showing changes of vehicle speed, throttle, brake, and gear with time, as well as displaying a graph showing changes of exhaust gas (CO, $CO_2$, NO, $NO_x$, and the like) with time acquired from the exhaust gas analyzers 30.

Further, as contents to be displayed in the test state display part L1 and the graph display part L2, exhaust gas data, gradient, vehicle speed, torque, rotation speed, EG state, various temperatures, and the like are displayed.

In addition, the display output part 47 is also one that acquires predetermined actual running data and test result data from the memory 48, as well as synchronizing these pieces of data with each other to output them comparably.

Figure 4:
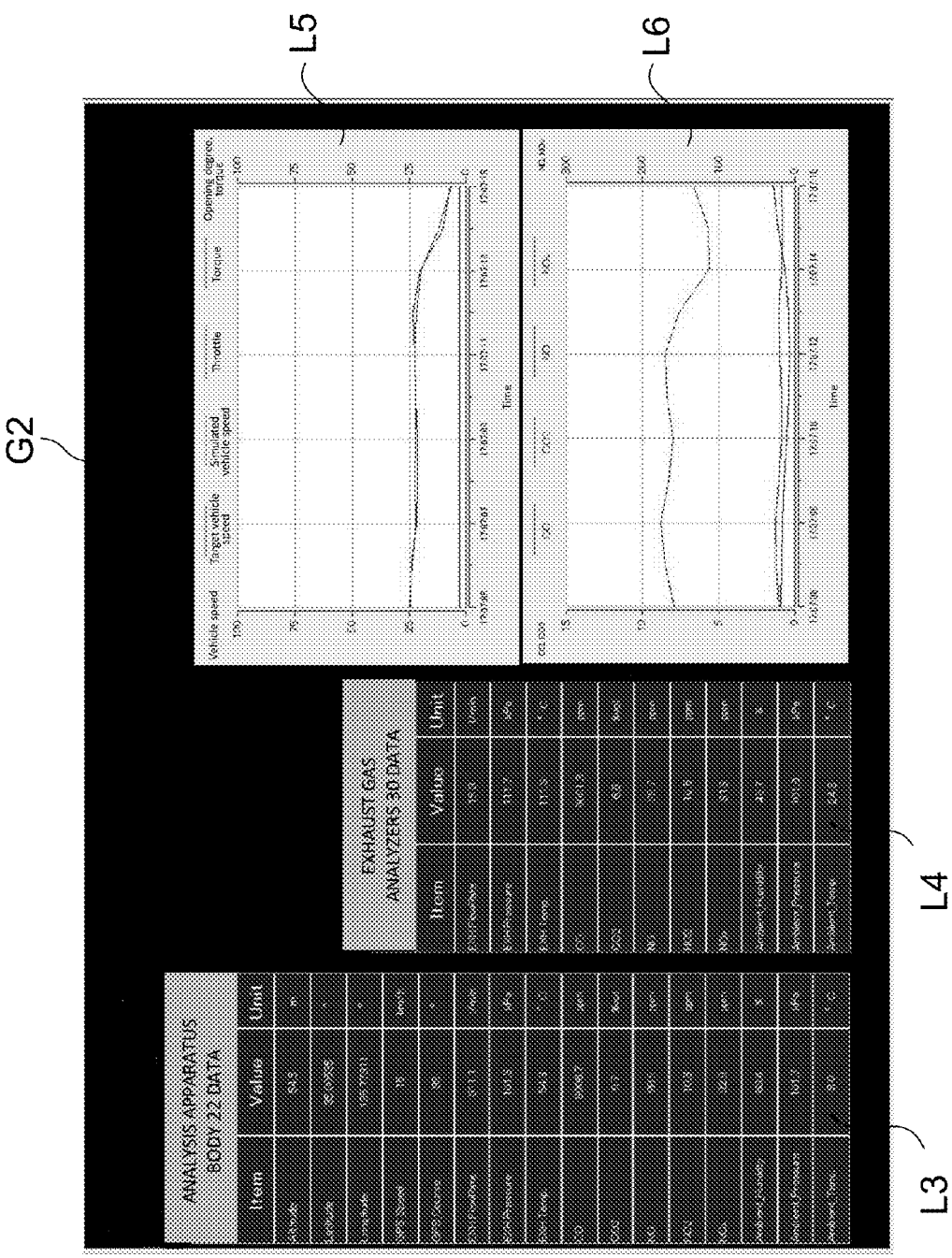
FIG. 4 is an image displayed on the display by the display output part in the present embodiment.

FIG. 4 illustrates an example of the output. FIG. 4 is an example of an image displayed on the display by the display output part 47. As the image G2 illustrates, a table L3 that lists exhaust gas concentrations analyzed by the analysis apparatus body 22 at the time of an actual run and is indicated by "Analysis apparatus body 22 data", and a table L4 that lists exhaust gas concentrations analyzed by the exhaust gas analyzer 30a at the time of the test in the chassis test apparatus 3a and is indicated by "Exhaust gas analyzers 30 data" are displayed on the left side of the screen. The table L3 and the table L4 are synchronized with each other in terms of running time from the start of the run.

Also, on the right side of the screen, a graph L5 indicating a vehicle speed, and a graph L6 indicating CO and $CO_2$ concentrations are displayed. In the graph L5, a curve indicated by "Target vehicle speed" represents a vehicle speed at the time of the actual run, and a curve indicated by "Simulated vehicle speed" represents a vehicle speed at the time of the test in the chassis test apparatus 3a. In addition, throttle and torque test results tested in the chassis test apparatus 3a are displayed. In the graph L5, the target vehicle speed, simulated vehicle speed, throttle, and torque are displayed in synchronization with one another in terms of running time from the start of the run. In addition, in the graph L6, the displayed exhaust gas concentrations ($CO$, $CO_2$, $NO$, $NO_x$, and the like) are ones obtained during the test in the chassis test apparatus 3a.

Further, this embodiment is adapted to be able to acquire actual running data and/or test result data from the memory 48 as well as acquiring imaging data on an external image and/or map data on a vehicle running position to simultaneously display these pieces of data on the same screen in synchronization with each other.

Figure 5:
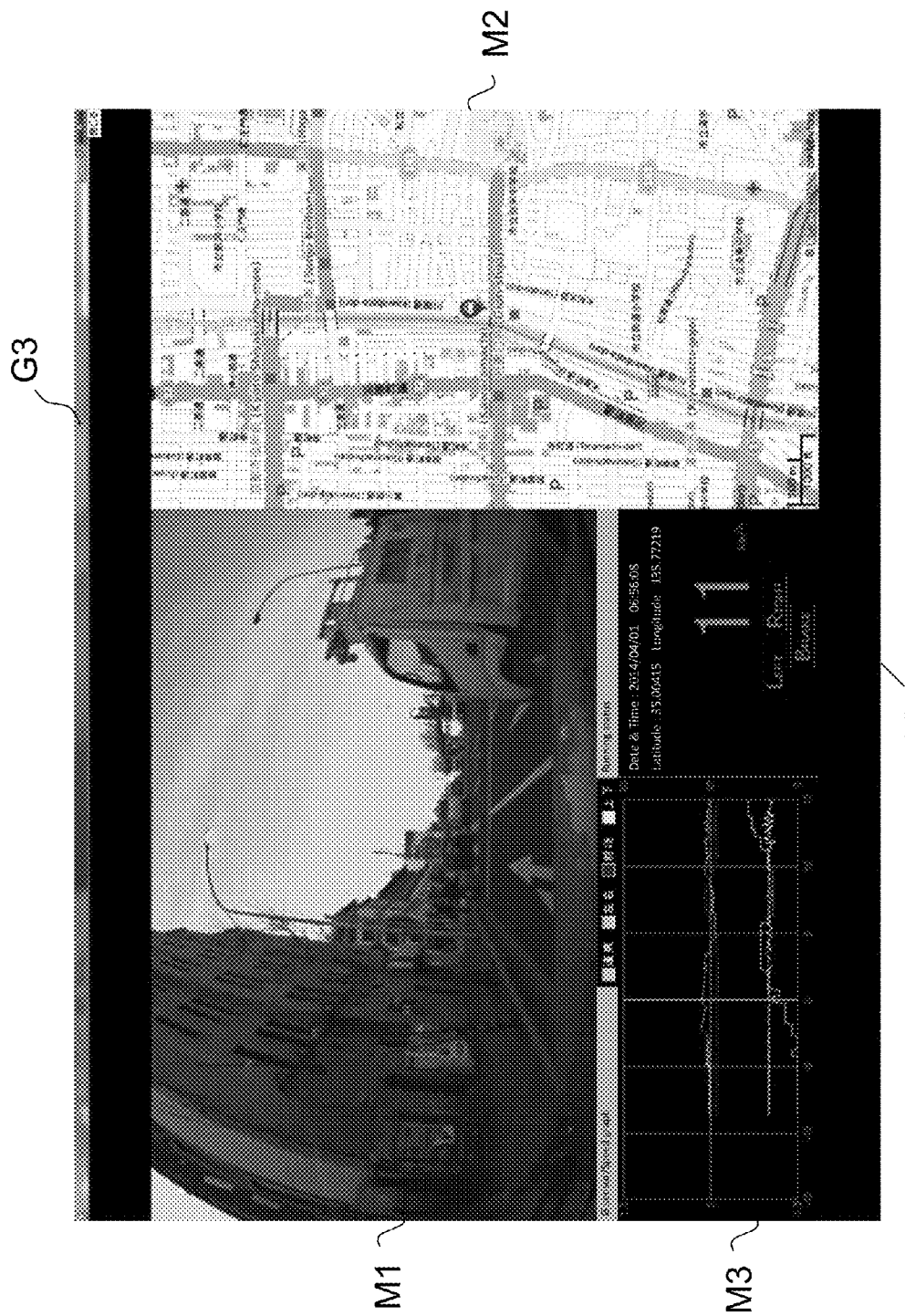
FIG. 5 is an image displayed on the display by the display output part in the present embodiment.
Figure 6:
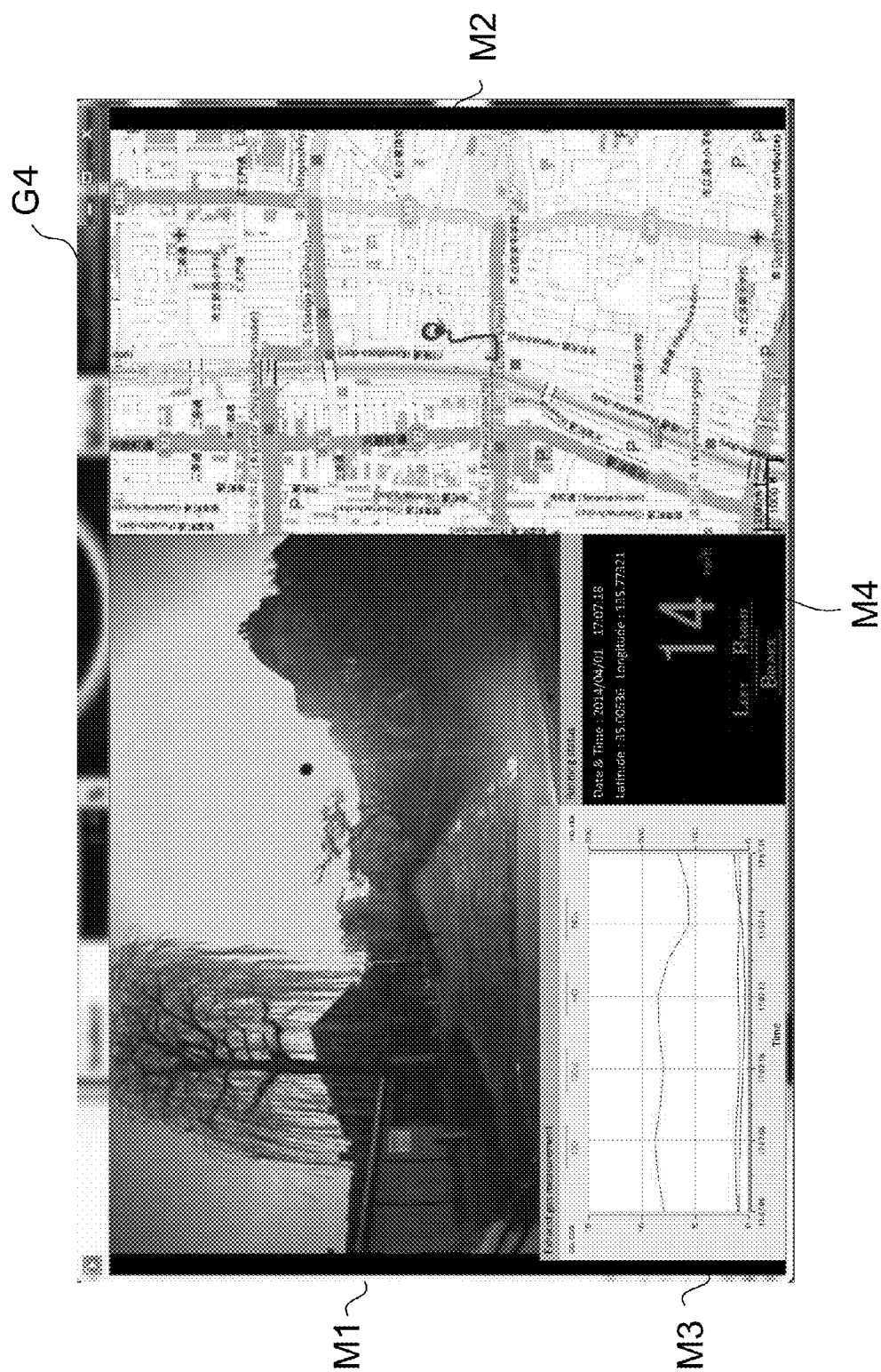
FIG. 6 is an image displayed on the display by the display output part in the present embodiment.

FIGS. 5 and 6 illustrate examples of the simultaneous display, respectively. FIGS. 5 and 6 are examples of an image displayed on the display by the display output part 47. As the image G3 or G4 illustrates, imaging data M1 at the time of an actual run, map data M2 indicating a position where the imaging data M1 was imaged, an information display part M4 displaying time of the actual run, the latitude and longitude of the position, and running speed, and a graph M3 indicating a time change in speed at the time of the actual run are collectively displayed on a screen G2. In addition, as the image G4 illustrates, in the map data M2, a locus along which a vehicle has run is displayed. Also, in the graph M3, exhaust gas data may be displayed in addition to running data. Further, the graph M3 can individually or simultaneously display actual running data (exhaust gas data) at the time of an actual run and/or test result data (exhaust gas data) in a test apparatus.

Note that the imaging data M1, pieces of information such as time of the actual run, the latitude and longitude of a position, and running speed displayed in the information display part M4, and the graph M3 are synchronized with one another in terms of running time from the start of the run.

Operation of the above-described test management apparatus 4 is described below.

First, the actual running data reception part 41 receives actual running data transmitted from the actual running data acquisition apparatus, and stores the actual running data in the predetermined area of the memory 48.

Then, on a test apparatus specifying screen displayed on the display of the test management apparatus 4, an operator specifies a test apparatus 3a, 3b, or 3c used for testing. For descriptive convenience, it is here assumed that the chassis test apparatus 3a is specified. Note that the number of test apparatuses to be specified is not limited to one, but may be multiple.

The test apparatus specifying part 42 transmits specified test apparatus data indicating the test apparatus specified upon receipt of an input signal by the operator to the test condition data generation part 44 and the schedule setting part 45. At this time, the chassis test apparatus 3a is registered in the memory 48 with the identifier thereof related to the contents and format of corresponding test condition data, and the contents and format of the test condition data of the specified chassis test apparatus 3a are also transmitted to the test condition data generation part 44 and the schedule setting part 45.

On the other hand, the operator selects a preferential test content on a preference order setting screen displayed on the display of the test management apparatus 4.

The simulation preference order setting part 43 receives an input signal by the operator, and transmits preferential data indicating the selected preferential test content to the test condition data generation part 44.

The test condition data generation part 44 receives the specified test apparatus data transmitted from the test apparatus specifying part 42 and the preferential data transmitted from the simulation preference order setting part 43, and acquires predetermined actual running data from the memory 48 to generate test condition data on the basis of the actual running data.

Then, the test condition data generation part 44 converts the generated test condition data into a predetermined format and transmits the converted test condition data to the chassis test apparatus 3a.

On the other hand, the schedule setting part 45 also sets a schedule corresponding to the test apparatus on the basis of the specified test apparatus data transmitted from the test apparatus specifying part 42 and the test condition data generated by the test condition data generation part 44, and transmits information on the schedule to the chassis test apparatus 3a.

The chassis test apparatus 3a performs the test on the basis of the test condition data generated by the test condition data generation part 44 and the schedule information set by the schedule setting part 45, and transmits test result data indicating a result of the test to the test result data reception part 46.

Upon receipt of the test result data, the test result data reception part 46 stores the test result data in the predetermined area of the memory 48.

Then, the display output part 47 displays the test result data on the display, as well as on the basis of an input method selected by the operator on an input method selection screen, comparably outputting the test result data and the actual running data, or pieces of test result data in synchronization with each other, or outputting imaging data on an external image or a vehicle running position, and the test result data and/or the actual running data on the same screen in mutual synchronization.

The present embodiment configured as described produces the following special effects.

Since the one test management apparatus 4 generates pieces of test condition data for performing the tests in the multiple types of test apparatuses 3a, 3b, and 3c, the multiple types of test apparatuses 3a, 3b, and 3c can be comprehensively managed and operated only by controlling the test management apparatus 4. For this reason, various tests for new vehicle development, problem correction, and the like can be smoothly performed.

Also, the test management apparatus 4 generates test condition data from actual running data, and therefore a state closer to an actual running state can be reproduced to increase the accuracy of a test.

Since actual running data is transmitted to the test management apparatus 4 in real time, the test management apparatus 4 can also generate pieces of test condition data in almost real time, and therefore the tests can be performed in the test apparatuses 3a, 3b, and 3c in almost parallel to an actual run. As a result, a problem occurring during the actual run can be immediately reproduced in the test apparatuses 3a, 3b, and 3c, thus making it possible to quickly analyze the problem.

The test management apparatus 4 selects actual running data necessary to reproduce a running state in a specified test apparatus, and generates test condition data from the selected actual running data. Specifically, an identifier of each of the test apparatuses and exhaust gas analyzers is registered in the memory 48 in relation to the contents and format of corresponding test condition data, and therefore only by specifying a test apparatus in the test apparatus specifying part 42, the test condition data generation part 44 can acquire the contents and format of test condition data related to the specified test apparatus from the memory 48.

For this reason, the test condition data generation part 44 can acquire only actual running data corresponding to contents of the acquired test condition data from the memory 48 to generate test condition data, and thereby shorten a time to process unnecessary data to smoothly generate test condition data corresponding to each of the test apparatuses.

Also, the test management apparatus 4 includes a simulation preference order setting part 43 adapted to specify an actual running data content to be preferentially simulated from among the contents of actual running data, and generates test condition data from the actual running data content specified in the simulation preference order setting part 43. As a result, test condition data corresponding to a user's desired content can be generated by the assistance of the simulation preference order setting part 43. For this reason, various tests such as tests in a failure reproduction mode and a specific running pattern reproduction mode can be performed, and a user-friendly system can be provided.

Since the display output part 47 comparably outputs test result data and actual running data, or pieces of test condition data, these pieces of data can be easily compared with each other to examine whether or not an actual run can be reproduced in a test apparatus 3a, 3b, or 3c, or confirm whether or not a test is successfully performed in a test apparatus 3a, 3b, or 3c. Also, by comparing pieces of data with each other, unprecedented new knowledge can be obtained. In addition, in the case where there is a discrepancy between actual running data and test result data, the extent of the discrepancy can be easily grasped.

Also, the display output part 47 comparably outputs test result data and actual running data, or pieces of test result data in synchronization with each other, and therefore both of them can be more easily compared.

In addition, since the display output part 47 displays imaging data and at least any one of test result data and actual running data on the same screen, a running environment, a driving situation, and the like at the time of an actual run can be known through the imaging data. As a result, in the case where a problem occurs in the test result data or the actual running data, the cause of the problem can be easily found out from the running environment or the driving situation at the time of the actual run.

Also, data can be analyzed while acquiring pieces of running information such as a running environment and a driving situation, and therefore the data can be more easily analyzed.

Since imaging data and at least any one of test result data and actual running data are displayed on the same screen in synchronization with each other, imaging data just at the time when a problem occurs in the actual running data and/or the test result data is displayed on the same screen. For this reason, a user can more easily find out the problem caused by a running environment.

Also, when testing a newly developed vehicle, a vehicle having an improved body, engine, and/or the like, or vehicles of different models, by using preliminarily generated test condition data, the vehicle test system can easily confirm whether or not a test is appropriate, measure exhaust gas, an engine, and/or the like, and have prior confirmation or the like before a road run without newly acquiring actual running data.

Besides, the present invention is not limited to the above-described embodiment.

For example, in the above-described embodiment, the test bench includes the chassis test apparatus, drivetrain test apparatus, and engine test apparatus, but can also include, in addition to these apparatuses, a brake dynamometer, a tire tester, a biaxial or triaxial drivetrain test apparatus, and the like.

Also, actual running data acquired by the actual running data acquisition apparatus is not limited to the above-described one as long as the data includes pieces of information obtained from inside and/or outside a vehicle.

Synchronization by the above-described display output part is performed not only in terms of time but may also be performed in terms of a time interval at which a unit or data is acquired, positional information, or the like. As an example of this, for example, the actual running data reception part does not make assignment to time data when receiving actual running data, but is configured to make assignment to positional information transmitted as part of the same actual running data to store it in the memory.

Such a configuration makes it possible for the display output part to acquire actual running data from the memory as well as acquiring actual running data on an external image or a vehicle running position, and synchronize these pieces of data in terms of positional information to display them on the same screen.

In addition, the display output part may be adapted to comparably display multiple pieces of data.

Figure 7:
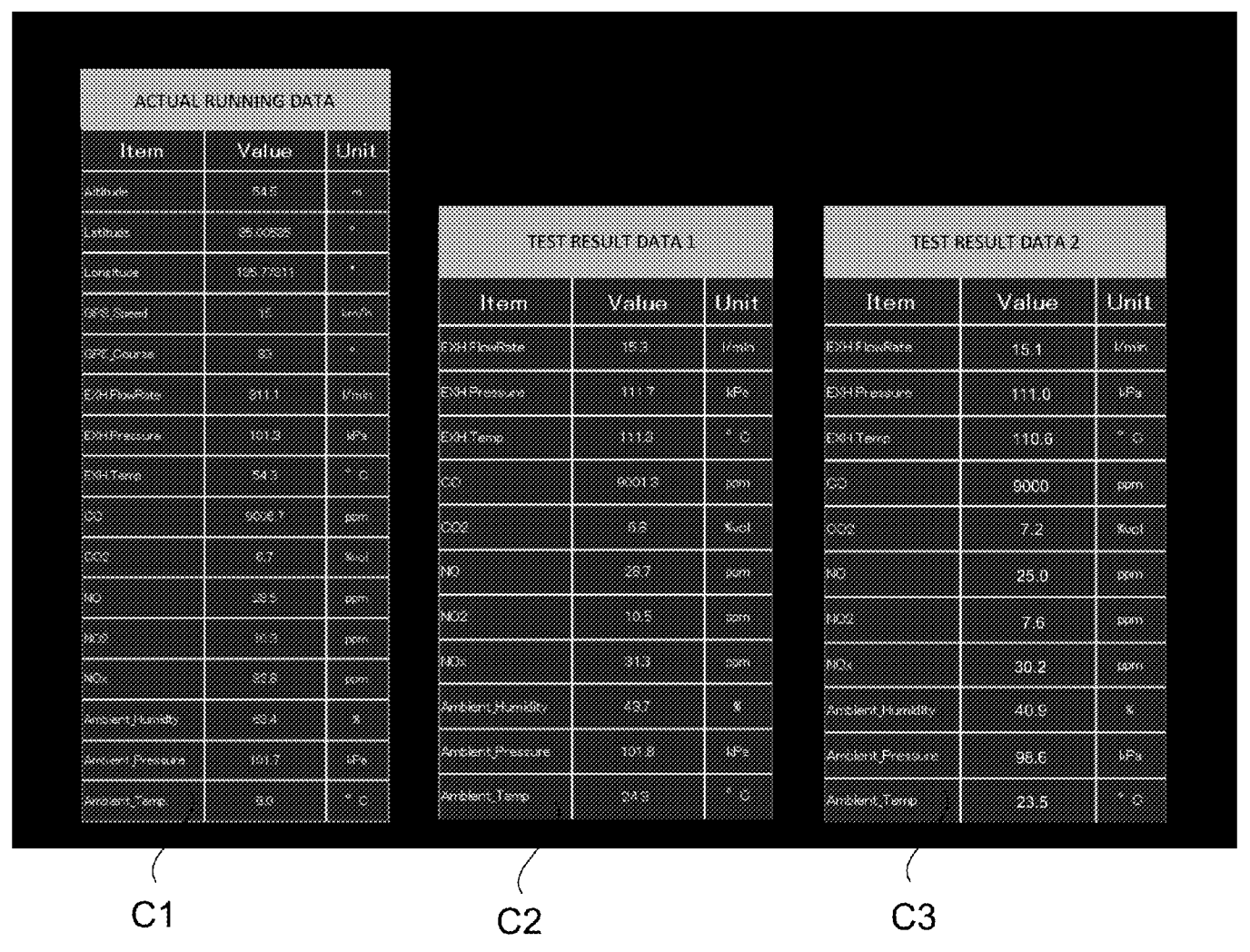

Examples of this include an display output part adapted to comparably display three pieces of exhaust gas data C1, C2, and C3 on a screen, for example, as illustrated in FIG. 7, exhaust gas data C1 as a result of analysis by an in-vehicle exhaust gas analyzer at the time of an actual run (in the diagram, indicated by "Actual running data"), exhaust gas data C2 as a result of analysis by an out-vehicle exhaust gas analyzer in the chassis test apparatus (indicated by "Test result data 1"), and exhaust gas data C3 as a result of analysis by an in-vehicle exhaust gas analyzer installed outside a vehicle in the same chassis test apparatus (indicated by "Test result data 2").

Such a configuration makes it possible to clarify the difference in measured value between the actual run and the test apparatus by comparing the pieces of exhaust gas data C1 and C2 respectively obtained when using the same in-vehicle exhaust gas analyzers to perform the exhaust gas analysis at the time of the actual run and to perform the exhaust gas analysis in the chassis test apparatus. Also, by comparing the pieces of exhaust gas data C2 and C3 respectively obtained when using the same chassis test apparatus to perform the exhaust gas analysis by the in-vehicle exhaust gas analyzer and to perform the exhaust gas analysis by the out-vehicle exhaust gas analyzer, the difference in measured value between the out-vehicle exhaust gas analyzer and the in-vehicle exhaust gas analyzer can be clarified, making it possible to perform analysis from various viewpoints.

Note that in FIG. 7, the pieces of data are displayed in a table format, but may be displayed using, for example, graphs or the like. Also, two of the pieces of exhaust gas data may be displayed. In addition, the pieces of exhaust gas data may be comparably outputted.

Further, in the case of displaying imaging data, the present invention may be configured to display actual running data including, for example, vehicle speed, exhaust gas, and the like at the time of an actual run, and imaging data at the time of the actual run, test result data including, for example, vehicle speed, exhaust gas, and the like in a test apparatus, and the imaging data at the time of the actual run, or the actual running data, test apparatus data, and imaging data.

Figure 8:
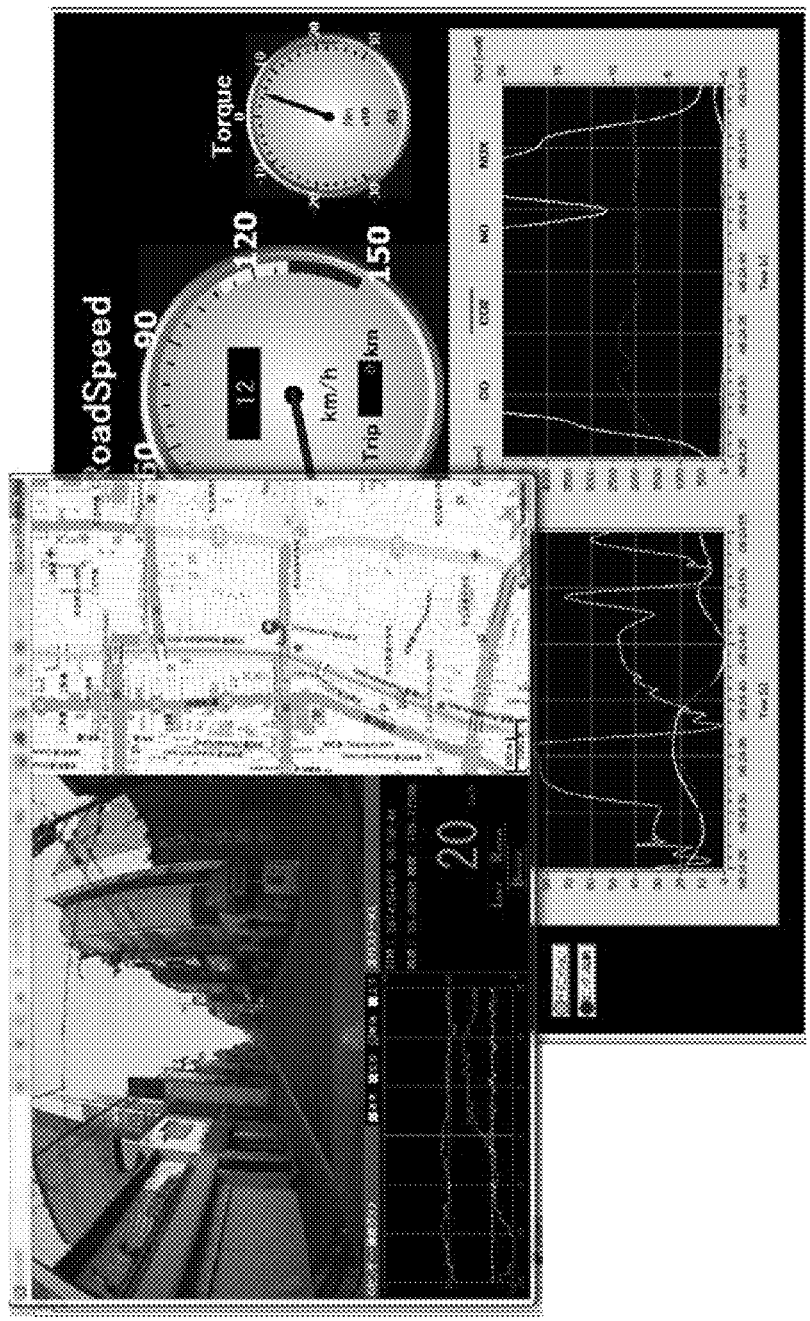
FIG. 8 is an image displayed on the display by the display output part in the present embodiment.

In addition, as illustrated in FIG. 8, the present invention may be configured to display two images on the same screen, i.e., an image in which imaging data at the time of an actual run and actual running data are synchronized with each other, and an image indicating test result data. Note that the above-described embodiment is adapted to display imaging data and map data on the same screen, but may be adapted to display any of them in an image.

Further, although the above-described screen G2 comparably displays the actual running data including the exhaust gas concentrations and the vehicle speed, and the test result data in the chassis test apparatus, display contents are not limited to the exhaust gas concentrations or vehicle speed, but may include, for example, brake torque, engine rotation speed, and the like. In addition, a display format of them can be appropriately changed to a graph format, a table format, or the other format. Further, a test apparatus is not limited to the chassis test apparatus. Still further, objects to be comparably displayed are not limited to the actual running data or the test result data, but may be pieces of test result data obtained using different test apparatuses.

Note that the different test apparatuses in the present invention also include the case where in the same test apparatus, different types of exhaust gas analyzers are provided, in addition to the case where the test apparatuses themselves are different.

It should be appreciated that the present invention can be variously modified without departing from the scope thereof.

REFERENCE SIGNS LIST

1: Vehicle test system
2: Actual running data acquisition apparatus
3: Test bench
4: Test management apparatus (test condition data generation apparatus)

What is claimed is:

1. A vehicle test system comprising:
an actual running data acquisition apparatus that acquires actual running data related to states inside and outside of a vehicle running on a road;
multiple types of test apparatuses each of which includes a dynamometer, and performs a drive test or an operation test of a vehicle or a part of the vehicle in accordance with a test condition; and
a test condition data generation apparatus adapted to generate, from the actual running data, test condition data indicating the test condition for reproducing a part or all of running states indicated by the actual running data, and performs a drive test or an operation test of a vehicle or a part of the vehicle in accordance with a set test condition, wherein
the test condition data generation apparatus comprises a simulation preference order setting part adapted to specify actual running data content to be preferentially simulated among contents of actual running data,
a test apparatus specifying part adapted to specify one or more of the dynamometers by receiving input, and
a test condition data generation part adapted to generate the test condition data from the actual running data content specified in the simulation preference order setting part, and to transmit the test condition data to one or more of the dynamometers specified in the test apparatus specifying part.

2. The vehicle test system according to claim 1, wherein the actual running data acquisition apparatus transmits the actual running data to the test condition data generation apparatus in real time, and
the test condition data generation apparatus is configured to transmit the test condition data to the multiple types of test apparatuses specified by the test apparatus specifying part.

3. A test condition data generation apparatus configured to receive data from an actual running data acquisition apparatus that acquires actual running data related to running states inside and outside of a vehicle running on a road,
the test condition data generation apparatus generating, from the actual running data, test condition data indicating a test condition for reproducing a part or all of the running states indicated by the actual running data in a test apparatus specified from among multiple types of test apparatuses each of which comprises a dynamometer, and performs a drive test or an operation test of a vehicle or a part of the vehicle in accordance with the test condition, wherein
the test condition data generation apparatus comprises a simulation preference order setting part adapted to specify actual running data content to be preferentially simulated among contents of actual running data,
a test apparatus specifying part adapted to specify one or more of the dynamometers by receiving input, and
a test condition data generation part adapted to generate the test condition data from the actual running data content specified in the simulation preference order setting part, and to transmit the test condition data to one or more of the dynamometers specified in the test apparatus specifying part.

4. A vehicle test method comprising:
acquiring actual running data related to states inside and outside of a vehicle running on a road, wherein the actual running data includes dependent contents that are dependent on each other;
generating on a basis of the actual running data, test condition data indicating a test condition for reproducing a part or all of running states indicated by the actual running data in a test apparatus specified from among multiple types of test apparatuses each of which comprises a dynamometer, and performs a drive test or an operation test of a vehicle or a part of the vehicle in accordance with the test condition;
specifying one or more of the dynamometers by receiving input;
specifying actual running data content to be preferentially simulated among contents of actual running data;
generating the test condition data from the actual running data content specified; and
transmitting the test condition data to one or more of the specified dynamometers.

* * * * *